United States Patent [19]

Dull

[11] Patent Number: 5,024,146
[45] Date of Patent: Jun. 18, 1991

[54] CHEESE DRAINER PAN ASSEMBLY

[75] Inventor: Gordon L. Dull, Soldiers Grove, Wis.

[73] Assignee: Wisconsin Dairies Cooperative, Baraboo, Wis.

[21] Appl. No.: 495,686

[22] Filed: Mar. 19, 1990

[51] Int. Cl.$^5$ .................... A01J 25/00; A23C 19/00
[52] U.S. Cl. ...................................... 99/458; 99/465; 292/175
[58] Field of Search .................. 99/452, 453, 456–459, 99/465; 100/107, 110; 292/175; 403/324, 328, 325

[56] References Cited

U.S. PATENT DOCUMENTS

| | | | |
|---|---|---|---|
| 372,645 | 11/1887 | Tweeddale | 292/175 |
| 1,020,301 | 3/1912 | McPheron | 403/324 |
| 4,263,330 | 4/1981 | Streeter et al. | 100/107 |
| 4,289,793 | 9/1981 | Gustofson et al. | 100/107 |
| 4,291,064 | 9/1981 | Retzlaff | 99/458 |
| 4,334,465 | 6/1982 | Brockwell et al. | 99/454 |
| 4,339,148 | 7/1982 | Smith et al. | 403/328 |

FOREIGN PATENT DOCUMENTS 1310890 10/1962 France .................... 99/458

Primary Examiner—Timothy F. Simone
Attorney, Agent, or Firm—Kenyon & Kenyon

[57] ABSTRACT

The present invention provides a drainer pan assembly especially useful in cheese curd processing having an easily removable drainer plate secured to a drainer pan by a plurality of restraints including at least one releasable restraint. Preferably, the releasable restraint is a spring loaded movable pin which engages the plate and the pan.

11 Claims, 2 Drawing Sheets

CHEESE DRAINER PAN ASSEMBLY

FIELD OF INVENTION

This invention relates generally to the manufacture of cheese and specifically to a drainer pan assembly which simplifies cleaning the bottom drainer plate used for draining whey from curd during manufacture of large cheese blocks.

BACKGROUND OF THE INVENTION

In general, cheese making is a fermentation process, wherein a bacterial starter culture is added to milk, followed by the addition of a coagulating enzyme, such as rennin. Coagulation of the milk forms a curd which includes a substantial amount of whey which is mostly water. The wet curd is cut into cubes and free-whey, not trapped in the curd, is drained away. Fermentation of the curd is allowed to proceed until a particular acidity is reached and then the fermented curd may be salted to extract additional whey. The partially dried curd is molded into blocks and residual whey trapped in the block is removed by pressing. It is usually in the molds that the cheese is cured to produce a particular aroma, texture and flavor.

Although the above process can be accomplished in batches which produce relatively small blocks of cheese, it is more economical and thus more common to make large blocks of cheese, for example, 600 lbs. or more, and thereafter later process the large blocks into smaller units. Such large scale cheese production requires equipment capable of handling the large blocks and involves various production problems. One such problem is variation in the moisture content throughout the large blocks. Whey tends to be retained near the center of large blocks because it does not migrate quickly to the surface of the blocks where it is easily drained away. Excess moisture content influences the properties of the curd directly and can alter the fermentation and curing rates. In addition, salt migration at the center of the block may also differ from salt migration at the outside of the block. Consequently, variations in moisture content throughout a cheese block may result in unacceptable variations in cheese texture, taste and overall quality, that would make large scale cheese production impossible without proper, i.e., uniform, drainage of whey from large cheese blocks. Moreover, moisture variations make it difficult for a producer to meet standards for a cheese product, and often necessitate overcompensation of moisture content at the outside of the cheese to make up for excess moisture content near the center of the cheese block.

A common approach to dealing with moisture variation problems which occurs with large cheese blocks is insertion of a perforated, rigid structure, e.g., a blade, into the cheese curd to provide channels for drainage of whey from the central portions of the curd to its surface during pressing. For example, U.S. Pat. Nos. 3,969,952 and 4,234,615 disclose apparatus having perforated V-shaped blades that are inserted into the curd during the pressing stage to facilitate drainage of residual whey from the center portions of large blocks. The term ,drainer blade,, as used herein, refers generally to structures, such as probes, screens or the like, which are inserted into curd or cheese blocks to form channels that facilitate drainage of moisture, e.g., whey, from central portions thereof.

Other patents which describe large scale cheese production methods and equipment are U.S. Pat. Nos. 2,851,776; 2,291,064; 3,100,712; 3,133,492; 3,355,805; 3,568,316; 3,719,994 and 4,418,616.

In conventional cheese making practice, wet curd is filled into a container, usually a rectangular, plywood or cardboard, box lined with plastic sheeting having an open top and open bottom. The open bottom of the container is usually closed by a drainer pan assembly comprised of a perforated bottom drainer plate nested into a complementary shaped pan having side walls, which catches whey passing from the curd through the drainer plate. The bottom drainer plate is usually bolted to the pan, but may be attached by weldments, rivets or the like and it may further include a plurality of drainer blades which project into curd in the container. Feet projecting from the bottom of the pan are adapted to rest on a dolly for moving the container from one manufacturing station to another. After filling, the container is rolled on the dolly to a processing station where top drainer plate having a plurality of drainer blades projecting therefrom is pressed into the container through the open top to compress the curd between the top drainer plate and bottom drainer plate thus eliminating voids and forcing whey out of the curd. The pressing apparatus is preferably pivotally mounted on a frame so that the pressing apparatus itself, the container and the drainer pan assembly can be tilted onto its side, i.e., 90°, so that free whey pressed out of the curd is rapidly drained away.

A disadvantage of the conventional drainer pan assemblies used in large scale cheese production are the cleaning problems associated with the inaccessible crevices and spaces created by the means used to attach the bottom drainer plate to the drainer pan. As noted above, conventional designs involve a drainer pan and bottom drainer plate attachment structure that creates inaccessible spaces; that may involve threaded surfaces in contact with the curd or whey; and that make disassembly difficult. Consequently, known drainer pan assemblies are difficult to disassemble and clean. Notably, threaded surfaces present difficult cleaning problems themselves.

Since cheese is an edible product, regular cleaning is necessary to insure that the sanitary standards required by the USDA or other regulatory authorities are maintained.

OBJECTS AND SUMMARY OF THE INVENTION

It is an object of the present invention to provide an improved drainer pan assembly including an easily removable bottom drainer plate which provides for rapid and efficient cleaning and maintenance.

It is another object of the present invention to provide an improved drainer pan assembly, useful in large scale cheese manufacture, that can be easily assembled and disassembled.

It is another object of the invention to provide a drainer pan design that can be retrofitted to or used in conventional cheese pressing apparatus and that provides easy assembly, disassembly and cleaning.

It is yet another object of this invention to provide a drainer pan assembly that enables sanitary production of cheese blocks of uniform moisture content and whey recovery.

The present invention provides a drainer pan assembly for cheese making including a pan having a drainer plate disposed therein and means for securely attaching the plate to the pan. Attaching is accomplished by means including a plurality of restraints, at least one of which is a releasable restraint, which secure the plate to the pan and are arranged with respect to each other so that when the releasable restraint is released the plate is easily removed from the pan and when engaged, the plate is secured in the pan.

The invention is described in greater detail below with reference to the embodiment illustrated in the accompanying drawings.

DETAILED DESCRIPTION OF THE INVENTION

Figure 1:
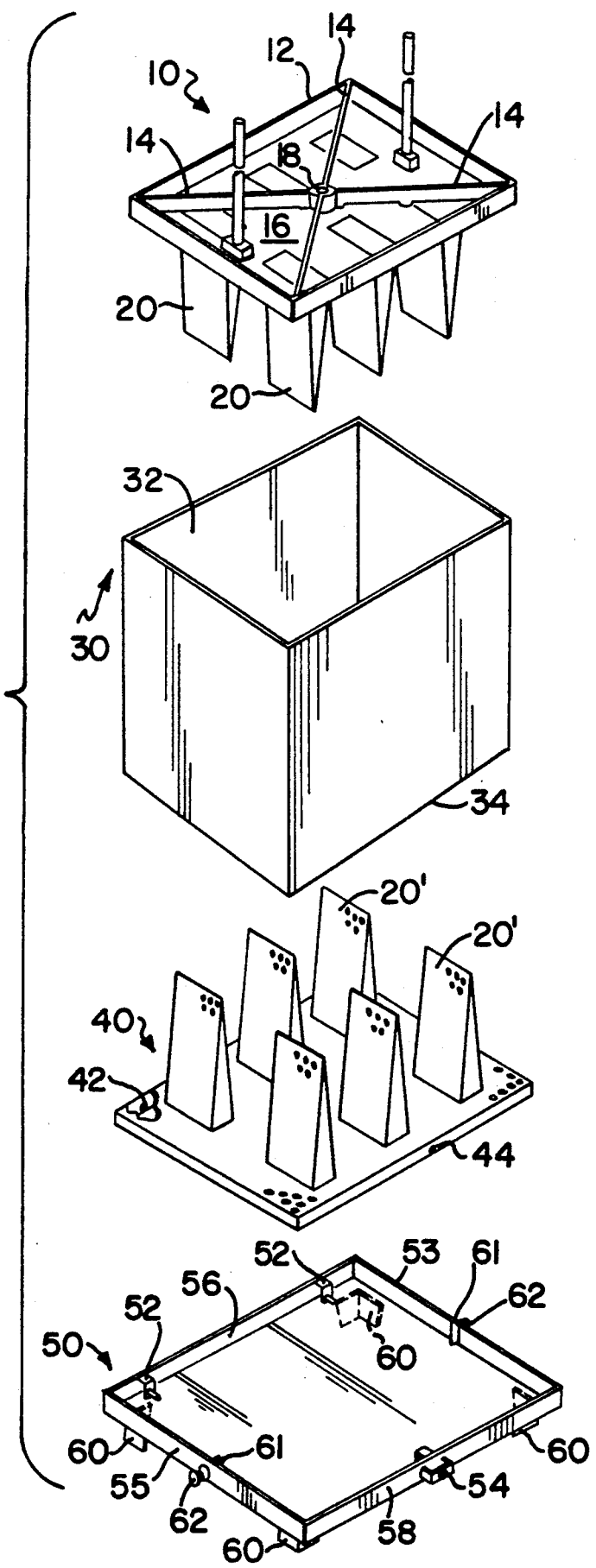
FIG. 1 is a partial isometric (assembly) view of a cheese pressing apparatus including a drainer pan (assembly) embodying the present invention.

Although this invention is susceptible to embodiment in many different forms, there is shown in the drawings and described herein in detail the preferred embodiment of the invention. It should be understood, however, that the present disclosure is considered an exemplification of the principles of the invention and is not intended to limit the invention to the illustrated embodiment. Moreover, the precise shapes and sizes of the components herein described are not essential to the invention unless otherwise indicated and the apparatus of the invention has certain conventional mechanisms, the details of which though not fully illustrated or described will be apparent to those having skill in the art. Although 304 stainless steel is preferred, the choice of materials is dependent upon the particular application involved and other variables, as those skilled in the art will appreciate.

FIG. 1 illustrates only those components of a pressing apparatus essential for an understanding of the present invention. The top drainer plate 10 includes a frame 12, and frame strengthening cross-members 14 having ram attachment means 18 located at the intersection thereof. A perforated sheet 16 is welded to the frame 12 and has six drainer blades 20 descending therefrom.

A cheese curd container 30 having open top 32 and open bottom 34 is positioned under the top drainer plate 10. Container 30 is fitted to mate in sliding engagement with the periphery of frame 12 to allow easy insertion and removal of the container 30. In operation the container rests on a drainer pan assembly 40, described below, so that top drainer plate 10 can be pressed into curd in container 30 by a hydraulic or pneumatic ram (not shown). The ram is coupled to top drainer plate 10 via attachment means 18.

Drainer pan assembly 40 closes the open bottom 34 holding curd in container 30 during pressing. Bottom drainer plate 41 has a plurality of drainer blades 20 projecting upwardly from its upper surface. Preferably, both bottom drainer plate 41 and blades 20, are perforated to permit whey drainage. The bottom drainer plate 41 is nested into drainer pan 50 and attached thereto via restraints 52 which insert into holes 42 in the bottom drainer plate 41. The restraints 52 are preferably attached to the interior side wall 56 of drainer pan 50 by welds and may maintain a space between side wall 56 and the bottom drainer plate 41. Spring loaded restraint 54 (better seen in FIG. 2) is located on side wall 58 of drainer pan 50 which opposes side wall 56. The spring-loaded restraint 54 is located at a position that permits its engagement with hole 44 in bottom drainer plate 41. Spacers 58 are provided in the other sidewalls to help position the bottom drainer plate 41 in drainer pan 50. Feet 60 on the bottom of drainer pan 50 are sized, shaped and located to securely engage a dolly (not shown) and handles 62 located centrally on opposing side walls 53 are provided for lifting the drainer pan assembly 40 during pressing/tilting and other operations.

Figure 2:
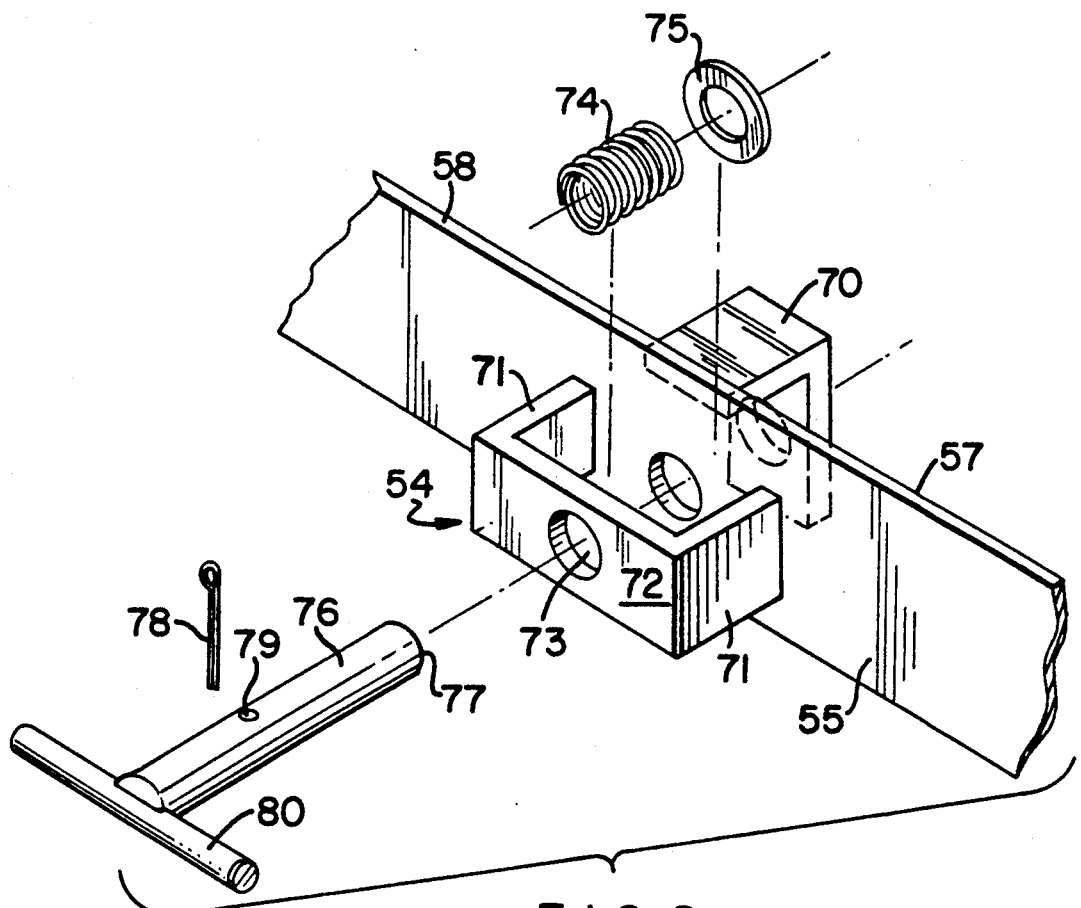
FIG. 2 is an exploded isometric view of the spring-loaded drainer plate release pin shown in FIG. 1.
Figure 3:
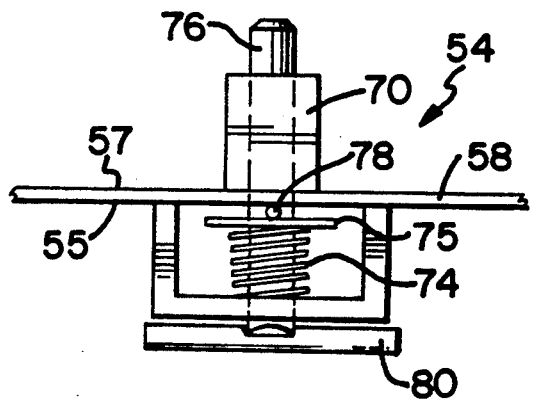
FIG. 3 is a cross-sectional view of the lower drainer plate release pin shown in FIG. 2.

The spring loaded restraint 54, illustrated in FIGS. 2 and 3, includes a bracket 70 which is welded to interior surface 57 to reinforce side wall 58 and to aid in positioning drainer plate 41. Legs 71 of U-shaped bracket 72 are welded to exterior side wall 55 and a centrally located release pin passage 73 or hole extends through bracket 72, side wall 78 and bracket 70. As best seen in FIG. 3, spring 74 and an opening in washer 75 are positioned co-axially with passage 73 and dowel-shaped release pin 76 is passed through the passage 73 the spring 74 and the washer 75. The washer 75 is positioned adjacent to exterior side wall 55 and cotter pin 78 is inserted into key hole 79 in release pin 76 thus retaining the release pin 76 in the passage 73 so that spring 74 urges an end 77 preferably rounded, of the pin 76 toward the interior or drainer pan 50. Handle 80 is welded to the opposite end so that when it is pulled away from the side wall 58 the end 77 of release pin 76 is retracted from the interior of drainer pan 50.

The process for attaching the bottom drainer plate 41 to drainer pan 50 to form the drainer pan assembly 40 is as follows: The drainer pan 50 is located on a flat horizontal surface and the release pin holes 42 therein are lined up so that restraints 52, e.g., posts, are passed therethrough; While handle 80 is pulled and held so that the end 77 of release pin 76 is retracted out of the interior of the drainer pan 50, the bottom drainer pan 41 is lowered so that release pin hole 44 is co-axially aligned with the release pin 76; When handle 80 is released the release pin 76 is urged through release pin hole 44 by spring 74 thus securely engaging the bottom drainer plate 41 and drainer pan 50.

To disassemble the drainer pan assembly the process is reversed, handle 80 is pulled and held so that release pin 76 is retracted from release pin hole 44 and bottom drainer plate 41 is simply lifted out of drainer pan 50.

The separated bottom drainer plate 41 and drainer pan 50 are easily cleaned. The surfaces thereof which contact the curd and whey are substantially free of crevices, inaccessible spaces and threaded surfaces which tend to trap dirt and debris making cleaning a difficult uncertain procedure.

While the preferred embodiment has been described herein, it is not intended to limit the invention thereto. Changes and modifications therein may occur to those skilled in the art in light of the present disclosure and such changes will form a part of this invention insofar as they fall within the scope and spirit of the appended claims.

What is claimed is:

1. A drainer pan assembly for large-scale cheese making comprising:
    a pan having a drainer plate disposed therein and means for securely attaching said plate to said pan; wherein said attachment means comprises a plurality of restraints, including at least one releasable restraint, which secure said plate to said pan and are arranged with respect to each other so that when the releasable restraint is released said plate is easily removed from said pan and when engaged said plate is secured in said pan; wherein said releasable restraint comprises a dowel and spring means for urging said dowel into releasable engagement with said drainer plate and said dowel and spring means are associated with the pan.

2. The drainer pan assembly of claim 1 wherein, said restraints comprise a dowel-shaped projection adapted to engage said drainer plate by extending through a cooperating opening in said drainer plate.

3. The drainer pan assembly of claim 2 wherein, said pan, drainer plate, restraints and releasable restraint are constructed of stainless steel.

4. The drainer pan assembly of claim 3 wherein, said drainer pan includes a plurality of drainer blades.

5. The drainer pan assembly of claim 1 wherein, said releasable restraint comprises, a reinforcement bracket welded to an interior wall of said drainer pan; a U-shaped bracket having legs welded to an exterior wall of said drainer pan, a passage through said drainer pan wall and brackets; a dowel disposed in said passage; a spring means for urging said dowel into engagement with an opening in said drainer plate when nested in said drainer pan.

6. A drainer pan assembly for large-scale cheese making comprising:

a pan having a drainer plate disposed therein said drainer plate being configured to support at least one drainer blade, and means for securely attaching said plate to said pan; wherein said attachment means comprises a plurality of restraints, including at least one releasable restraint, which secure said plate to said pan and are arranged with respect to each other so that when the releasable restraint is released said plate is easily removed from said pan and when engaged said plate is secured in said pan.

7. The drainer pan assembly of claim 6 wherein, said releasable restraint comprises a dowel and springs means for urging said dowel into releasable engagement with said drainer plate, said dowel and spring means being associated with the pan.

8. The drainer pan assembly of claim 7 wherein, said restraints comprise a dowel-shaped projection adapted to engage said drainer plate by extending through a cooperating opening in said drainer plate.

9. The drainer pan assembly of claim 8 wherein, said pan, drainer plate, restraints and releasable restraint are constructed of stainless steel.

10. The drainer pan assembly of claim 9 wherein, said drainer pan includes a plurality of drainer blades.

11. The drainer pan assembly of claim 6 wherein, said releasable restraint comprises, a reinforcement bracket welded to an interior wall of said drainer pan; a U-shaped bracket having legs welded to an exterior wall of said drainer pan, a passage through said drainer pan wall and brackets; a dowel disposed in said passage; a spring means for urging said dowel into engagement with an opening in said drainer plate when nested in said drainer pan.

* * * * *